Nov. 23, 1948.　　　　J. MARSH　　　　2,454,662
DEVICE FOR MIXING FERTILIZER WITH SOIL AND SCREENING
Filed Sept. 14, 1945　　　　　　　　3 Sheets-Sheet 1

INVENTOR.
James Marsh.
BY
Frank C. Lorman.
Attorney.

Nov. 23, 1948.  J. MARSH  2,454,662
DEVICE FOR MIXING FERTILIZER WITH SOIL AND SCREENING
Filed Sept. 14, 1945  3 Sheets-Sheet 2

INVENTOR.
James Marsh.
BY Frank C. Fearmon.
Attorney.

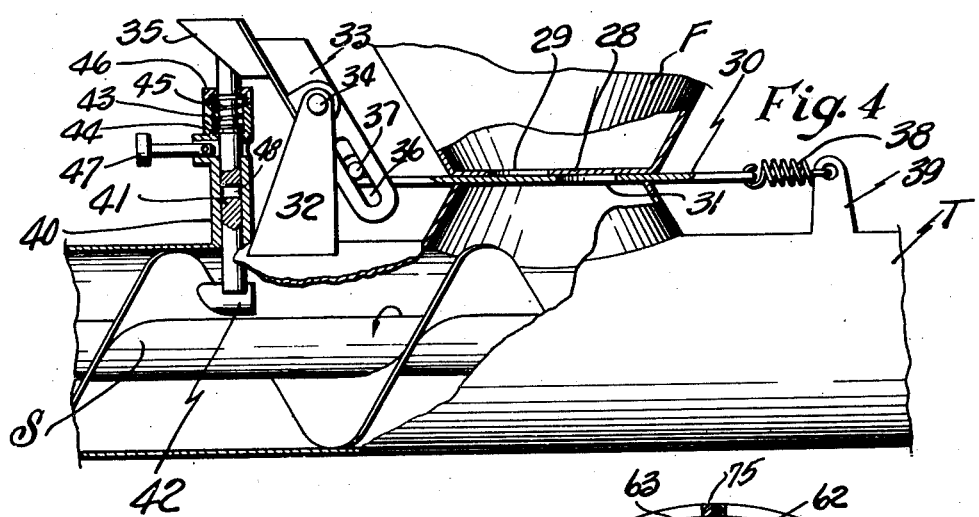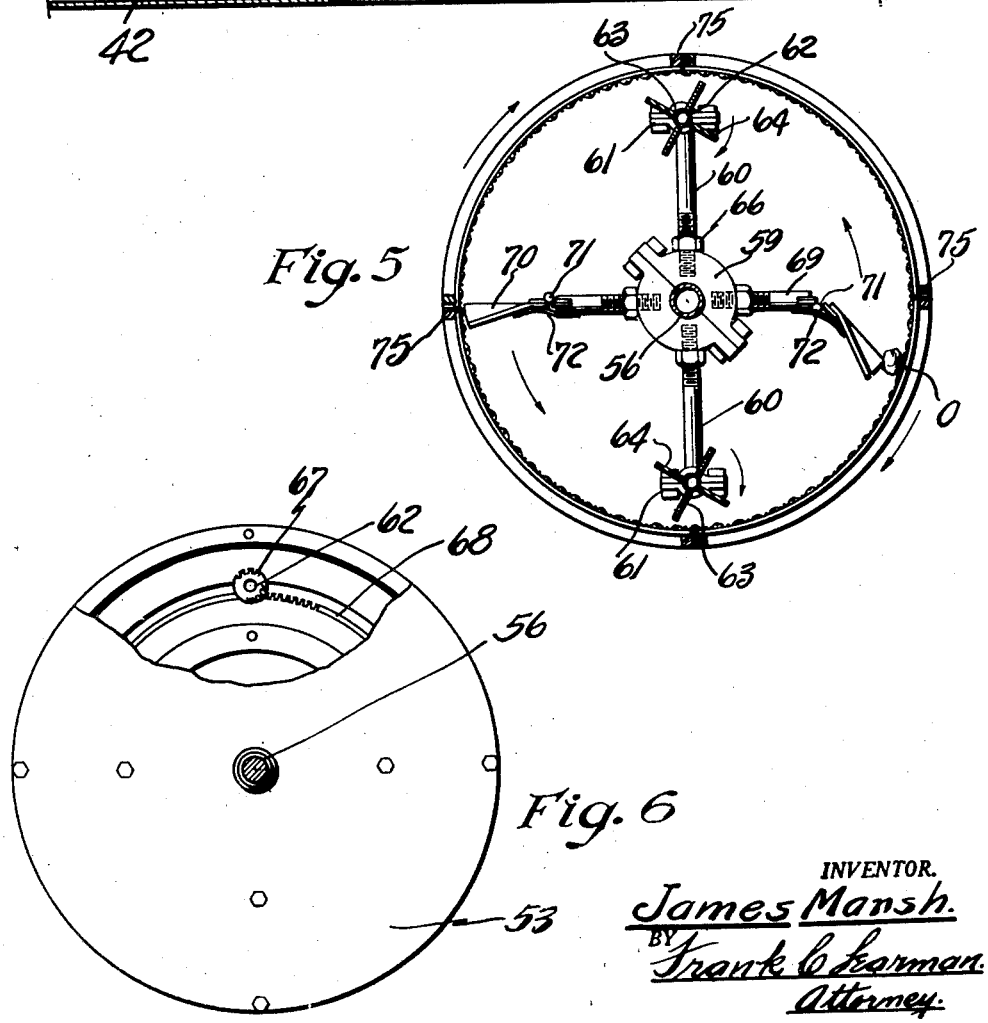

Patented Nov. 23, 1948

2,454,662

UNITED STATES PATENT OFFICE 2,454,662

DEVICE FOR MIXING FERTILIZER WITH SOIL AND SCREENING

James Marsh, Bay City, Mich.

Application September 14, 1945, Serial No. 616,279

10 Claims. (Cl. 209—236)

This invention relates to a power actuated, conveying, mixing and screening machine for use by greenhouses, nurseries, vegetable growers, and others having work of this nature.

One of the prime objects of the invention is to design a machine for conveying and screening soil, etc. and also providing means for mechanically adding predetermined quantities of fertilizer etc. to the soil as it is being conveyed.

Another object is to provide a mobile screening device that can be easily moved from one location to another, and which can be operated by a single person to accomplish the feeding of the soil and the addition of the fertilizer preparatory to the final screening operation.

In the potting and planting of small plants, seeds, or in transplanting, it is highly desirable to have properly screened, fluffy soil with proper amount of fertilizer, sand, or other material added thereto to promote the rapid growth, germination, and handling of the plants and seeds. Heretofore, each operation has been a manual operation, somewhat haphazard, resulting in uneven mixture, lumpy soil, not properly fluffed, and improper distribution of the fertilizer, etc., as well as causing a great deal of time and labor at excessive cost. And this I have eliminated in the instant machine which conveys, agitates, and mixes the soil and fertilizer or other material, and screens and fluffs the final product.

Still a further object is to provide easily adjustable means for regulating the volume of fertilizer, sand or other material to be mixed with the soil as it is conveyed to the screen.

A further object still is to design a screening machine of simple and substantial construction, which can be readily manufactured and assembled, and which will save a great deal of time, labor and cost in the conveying, mixing and screening of soils and fertilizers of various classifications.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion and minor details of construction, without departing from the spirit or sacrificing any of the advantages of the invention.

In the drawings:

Fig. 4 is an enlarged, fragmentary, part-sectional side-elevational view of the fertilizer trough, hopper, and feeding mechanism.

Fig. 5 is a transverse-sectional view through the drum.

Fig. 6 is an end-elevational view of the rear end of the drum, the end plate being broken away to show the drive.

Fig. 7 is a fragmentary, plan, elevational view illustrating the pivoted axle.

Figure 1:
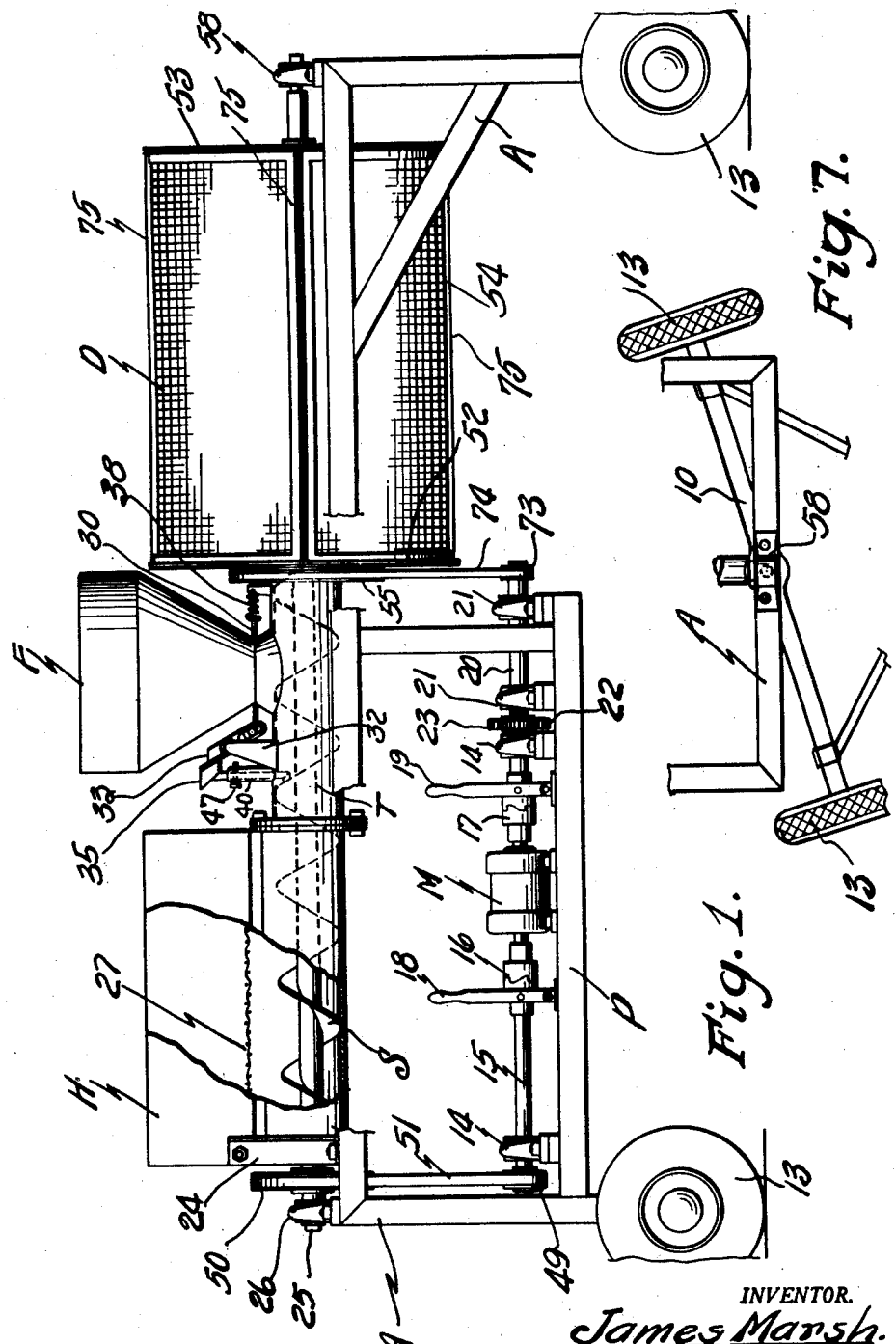
Fig. 1 is a side-elevational view of my screening machine, parts being broken away to show the interior.

Referring now more particularly to the drawings, the machine comprises a structural frame A having bearings 8 in which the front axle 9 is journaled. The rear axle 10 is pivoted to the main frame A at the point 12 so that it can be readily turned, and ground engaging wheels 13 are mounted on each axle in the conventional manner.

A platform P spans the lower portion of the main frame as shown, and a drive motor M is mounted thereon and is connected to any convenient source of power such as a light socket (not shown), or the like, and while in the present instance I have shown an electric motor, I wish it clearly understood that an internal combustion engine or any other form of driving power may be utilized.

Bearings 14 are provided on the platform P, and a drive shaft 15 is journaled in said bearings, clutches 16 and 17 respectively being interposed in said drive shaft on opposite ends of the motor, and are operable by means of clutch levers 18 and 19 as usual.

A short stub shaft 20 is journaled in bearings 21 provided on the platform P directly adjacent the drive shaft 15, and intermeshing gears 22 and 23 are provided on the respective shafts for imparting motion to the shaft 20.

A material or soil hopper H is mounted in brackets 24 provided on the main frame above the platform P, and a screw conveyor S is mounted therein, the front end of the shaft 25 being journaled in a bearing 26 provided on the frame as usual with the rear end supported in a manner to be presently described.

A suitable screen 27 is removably mounted in the hopper H directly above the screw conveyor S, and serves to screen out large lumps or other bulky foreign matter as the soil is shoveled or dumped into the hopper as the machine is operated.

A closed conveyor trough T leads from the hopper H to a screened sifter drum D, and the screw conveyor S extends therethrough for conveying the soil to said drum.

A fertilizer hopper F is mounted on and opens into the conveyor trough T, and a transversely disposed plate 28 spans said hopper, a port or opening 29 being provided therein as shown. A movable feed plate 30 is mounted in the hopper F below the plate 28, and a port or opening 31 is provided therein, said plate being adapted to be actuated, as will be hereinafter described, to bring the openings 29 and 31 into register to admit a predetermined quantity of fertilizer, sand or other material to the conveyor.

The feed plate 30 is actuated by the conveyor S, a bracket 32 being provided on the trough T, and a lever 33 is pivotally connected thereto by means of pin 34, this lever 33 being provided with an angularly faced contact block 35 secured to the one end thereof, and a slotted opening 36 is provided in the opposite end as shown.

An offset pin 37 is provided on the feed plate 30 for engagement in the slot 36, the opposite end of the feed plate projecting beyond the hopper F, and a coil spring 38 is attached thereto and to a post 39 provided on the trough.

A plunger housing 40 is mounted on the trough T directly adjacent the bracket 32, and a vertically disposed plunger 41 is slidably mounted therein, the lower end of the plunger extending into the trough and path of travel of the conveyor, and is formed with a contact shoe 42 which engages the conveyor to effect reciprocation of the plunger 41.

The upper end of the housing 40 has an enlarged bore 43, and a collar 44 is provided on the plunger 41 at a point intermediate its length, said collar being disposed in the bore 43, and a coiled spring 45 is interposed between the collar 44, and a cap 46 is provided on the upper end of the housing, said spring forcing the plunger downwardly at the end of each stroke.

The upper end of the plunger 41 is formed with a beveled face as shown, said face engaging the beveled face of the block 35 so that the feed plate will be actuated accordingly, the spring 45 serving to return the plate to original position, each stroke of the feed plate bringing the openings 29 and 31 into register, thus permitting predetermined quantities of fertilizer, sand or other material to be fed into the soil as it is being conveyed to the drum.

The feed plate 30 can be readily disconnected when desired, a pin 47 being mounted on the housing 41, and an opening 48 is provided in the plunger so that the plunger may be raised to bring the opening 48 into alignment with the pin 47 which can be used to hold the plunger out of contact with the conveyor.

Drive pulleys 49 and 50 are mounted on the shafts 15 and 25, and a belt 51 drivingly connects the pulleys so that the conveyor is driven accordingly, the clutch 16 serving to clutch or declutch the conveyor from the drive motor.

Figures 2, 3:
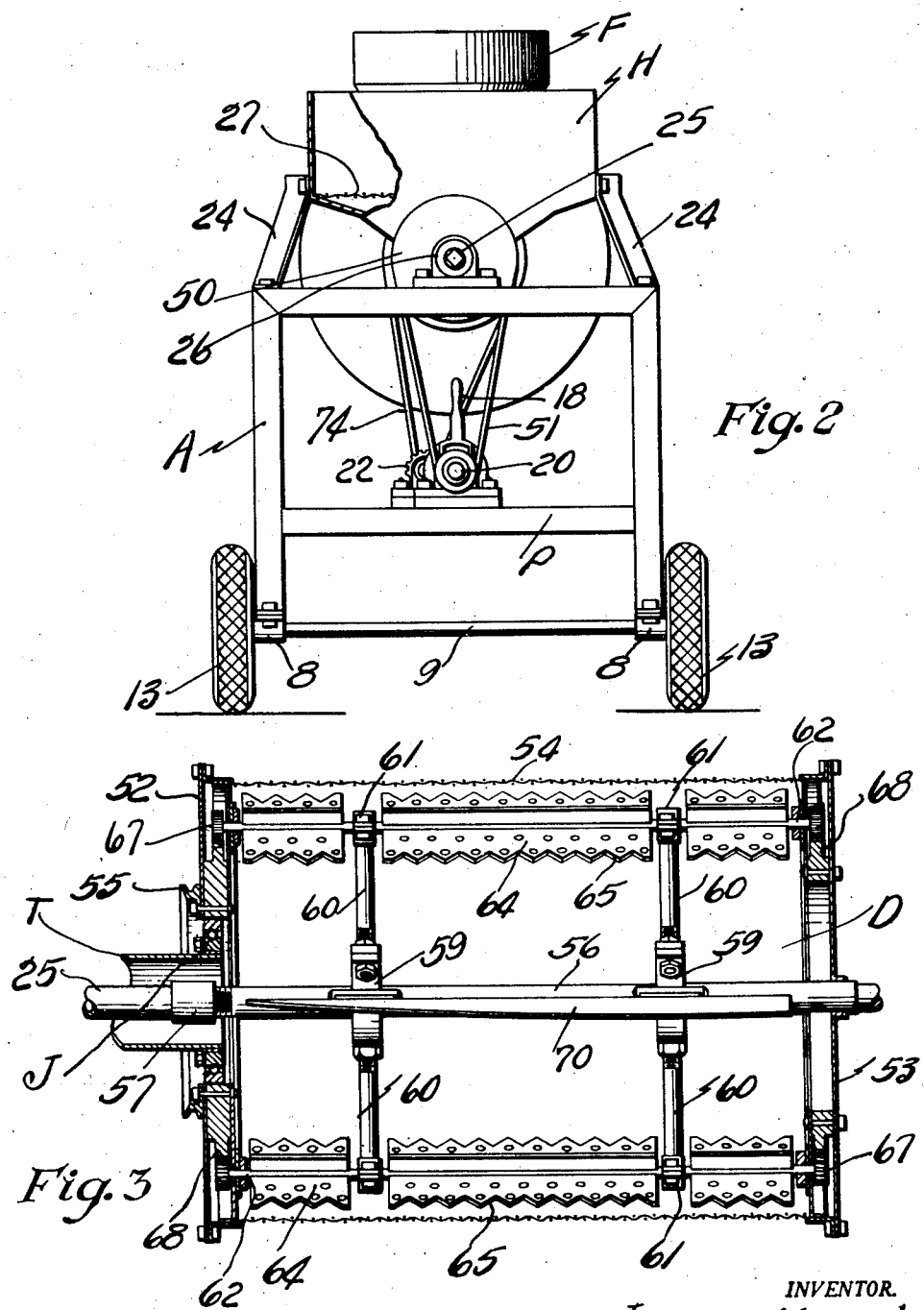
Fig. 2 is a front, end-elevational view.
Fig. 3 is an enlarged, sectional, side-elevational view of the screening drum.

The sifter drum D is formed as clearly shown in Figs. 3 and 5 of the drawings, it comprises spaced-apart end frames 52 and 53, and circular screen panels 54 connect these end frames, the front end being journaled in a bearing J mounted on the one end of the conveyor trough, and a drive pulley 55 is secured to the end frame 52 as shown.

A drive shaft 56 is coupled to the end of the screw conveyor shaft by means of a coupling 57, the opposite end being journaled in a bearing 58 which is mounted on the frame A so that the screw conveyor is supported on the bearings 26 and 58 respectively.

Split hubs 59 are provided on the shaft 56, and spokes 60 are threaded therein, the outer ends of certain of the spokes terminating in bearings 61 in which shafts 62 are journaled.

Fluffer reels 63 are mounted on the shafts 62 and comprise radiating blade members 64, the free ends of which are serrated as at 65 for breaking up small lumps, fluffing and fining the soil being screened, these spokes 60 are threaded in the hub so that they may be adjusted, and lock nuts 66 serve to secure them in adjusted position.

Spur gears 67 are provided on the ends of the shafts 62, these gears meshing with and being driven from the ring gears 68 provided on the end frames, so that rotation of the fluffing and agitating mechanism is opposite to the direction of rotation of the drum.

Spokes 69 are also provided in the hubs 59, these spokes being shorter than spokes 60, and agitating blades 70 are hingedly connected thereto at the point 71, these blades being longitudinally pitched to carry the soil back and forth in the drum, one blade being pitched forwardly, while the next blade is pitched rearwardly.

A leaf spring 72 is secured to each spoke 69, and bears against the blade 70 to force the blade back to original position after it has been sprung to permit passage of a lump or hard object O, and as shown in Fig. 5 of the drawings.

A drive sheave 73 is provided on the end of the drive shaft 20, and a belt 74 drivingly connects the sheaves 55 and 73 for imparting motion to the drum D independently of the screw conveyor drive, and it will be clearly obvious that either the drum unit or the conveyor unit are independently operable or that they can operate in unison as desired.

When it is desired to screen and fluff soil and add and mix the fertilizer therewith, the motor M is first connected to a convenient source of power, the clutch handle 18 is then actuated to engage the clutch 16 which drives the screw conveyor S, soil is then shoveled or dumped into hopper H and the fertilizer, sand or other material is dumped into the hopper F, and with the contact shoe 42 of the plunger 41 in position as shown in Fig. 4 of the drawings, the feed plate 30 will be actuated to feed fertilizer to the trough as the screened soil is conveyed to the drum.

The clutch lever 19 controls clutch 17 which drives the drum D through gears 22 and 23, and in the opposite direction to the screw conveyor, however, the entire reel assembly R rotates in the same direction as the screw conveyor because the shaft 56 is, in fact, but an extension of the conveyor shaft 25.

As the mixed soil and fertilizer is conveyed and discharged into drum D through the open end of the conveyor trough T, it is carried up as the drum is driven, the fluffer reels 63 rotate in a direction opposite to the direction of rotation of the drum, the blades 64 fluffing and breaking the lumps, forcing the soil through the screen while the agitating blades 70 move the soil back and forth, the entire mass being agitated and rolled until it is of sufficiently fine consistency to sift through the screen and fall onto the floor or into a receptacle (not shown) provided beneath the drum.

As previously pointed out, either the conveying unit or the screening unit can be easily and quickly connected and/or disconnected, and it will be obvious that the fertilizer feeding mechanism can also be quickly disconnected, furthermore, if for any reason it is desired to remove the drum, this can be readily accomplished by merely disconnecting the drive belt and disconnecting the shaft 56 from the coupling 57.

The screen for the drum can be made in sections as desired, the edges of the screen frames 75 being secured together in any desired manner.

From the foregoing, it will be obvious that I have perfected a very simple, practical and relatively inexpensive mobile unit for screening, preparing and mixing soils and fertilizers for greenhouses, growers and other requiring fine, fluffy soil without lumps.

What I claim is:

1. In a screening device of the character described, a mobile frame, a soil hopper mounted thereon, a screw conveyor in said hopper, a sifter drum in substantially horizontal alignment with the conveyor and into which said conveyor discharges, a fertilizer hopper interposed between the soil hopper and the drum, means operable by the conveyor flight for discharging predetermined quantities of fertilizer into said conveyor at predetermined intervals, a power plant, and independent driving means for drivingly connecting said screw conveyor and/or said sifter drum with the power plant, and driven means in said drum and rotatable in a direction opposite to the rotation of the drum for agitating and fluffing the soil as the mechanism is driven.

2. A combination as defined in claim 1 in which a screen is provided in the hopper above said conveyor for screening the material fed to said conveyor.

3. The combination as defined in claim 1 in which the driven means comprises a rotatable reel mounted in the sifter drum and connected to the screw conveyor, independent agitating and fluffing means respectively mounted on the outer periphery of the reel, and means from said drum for driving said fluffing means.

4. A construction as set forth in claim 1 in which said reel includes a plurality of radially spaced spokes longitudinally disposed scraper blades on each alternate set of spokes with each alternate blade being oppositely pitched, and fluffer members journaled on the outer ends of the remaining sets of spokes, a ring gear on the drum, and means for drivingly connecting said fluffer members with said ring gear.

5. In a screening and mixing machine of the class described comprising a mobile frame, a soil hopper mounted thereon, and a trough connected thereto, a driven sifter drum at the end of said trough, a screw conveyor mounted in said hopper and trough and discharging into said drum, a power plant, clutch means for independently connecting and/or disconnecting said conveyor and said sifter drum with said power plant, a driven reel in said drum, a fertilizer hopper interposed between said soil hopper and the reel, means associated with said hopper and operable from said conveyor flight for discharging measured quantities of fertilizer from said hopper into the conveyor at spaced intervals, hinged spring retracted scraper blades mounted on the outer periphery of said reel for agitating and traveling the material fed to the drum.

6. A construction as defined in claim 5 in which the fertilizer hopper has a feed plate mounted therein, and means on said trough and actuated by the conveyor flight for reciprocating said feed plate to feed predetermined quantities of fertilizer to the conveyor as it is driven.

7. The combination as defined in claim 5 in which positively driven and longitudinally disposed fluffer assemblies are journaled on the outer periphery of the reel, said fluffer assemblies being formed with serrated edges for crushing and fluffing the material fed to the drum, a ring gear on the drum, and means for drivingly connecting said fluffer assemblies with said ring gear.

8. The combination in a screening and mixing machine, a mobile frame, a soil hopper mounted thereon and a conveyor trough connected thereto, a conveyor mounted therein, a power plant on the frame and drivingly connected to said conveyor, a fertilizer hopper on said trough, a discharge opening of limited diameter in the bottom wall thereof, a spring retracted feed plate mounted in the hopper, and provided with an opening therein, a feed plate operating lever pivotally mounted on the trough and connected to said plate, and reciprocable means extending into the path of travel of the conveyor flight for actuating said lever and feed plate to bring the opening in the feed plate into register with the opening in the bottom wall of the fertilizer hopper to feed fertilizer to said trough.

9. A combination as set forth in claim 8 in which means is provided for securing the reciprocable means in raised position and out of engagement with the conveyor.

10. The combination as defined in claim 8 in which a shoe is provided on the lower end of the reciprocable means for engagement with the conveyor flight.

JAMES MARSH.

REFERENCES CITED

The following references are of record in the file of this patent:

UNITED STATES PATENTS

| Number | Name | Date |
|---|---|---|
| 92,327 | Loeffel | July 6, 1869 |
| 124,244 | Bowden | Mar. 5, 1872 |
| 748,366 | Grave | Dec. 29, 1903 |
| 1,110,515 | Sturgis | Sept. 15, 1914 |
| 1,782,084 | Wright | Nov. 18, 1930 |
| 1,848,225 | Schmidt | Mar. 8, 1932 |
| 2,177,614 | Trick | Oct. 24, 1939 |

FOREIGN PATENTS

| Number | Country | Date |
|---|---|---|
| 36,438 | Germany | Aug. 11, 1886 |